United States Patent
Haseltine et al.

(10) Patent No.: US 10,542,236 B2
(45) Date of Patent: Jan. 21, 2020

(54) IMAGE DISPLAY SYSTEM WITH VISUAL FILTER

(71) Applicant: Disney Enterprises, Inc., Burbank, CA (US)

(72) Inventors: Eric C. Haseltine, Burbank, CA (US); Michael P. Goslin, Sherman Oaks, CA (US); Nathan Nocon, Valencia, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/011,505

(22) Filed: Jun. 18, 2018

(65) Prior Publication Data
US 2019/0387194 A1    Dec. 19, 2019

(51) Int. Cl.
*H04N 5/72*  (2006.01)
*H04N 5/445*  (2011.01)
*G02B 5/23*  (2006.01)

(52) U.S. Cl.
CPC .............. *H04N 5/72* (2013.01); *G02B 5/23* (2013.01); *H04N 5/44513* (2013.01); *H04N 2005/44517* (2013.01)

(58) Field of Classification Search
CPC .............. H04N 5/72; H04N 5/44513; H04N 2005/44517; G02B 5/23
See application file for complete search history.

(56) References Cited

U.S. PATENT DOCUMENTS

| | | |
|---|---|---|
| 4,943,851 A | 7/1990 | Lang |
| 5,057,827 A | 10/1991 | Nobile |
| 5,148,310 A | 9/1992 | Batchko |
| 5,239,892 A | 8/1993 | Sakai |
| 5,714,997 A | 2/1998 | Anderson |
| 6,115,006 A | 9/2000 | Brotz |
| 6,183,088 B1* | 2/2001 | LoRe .................. G02B 27/2285 353/7 |

(Continued)

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.

(Continued)

*Primary Examiner* — Jason A Flohre
(74) *Attorney, Agent, or Firm* — Farjami & Farjami LLP

(57) ABSTRACT

According to one implementation, an image display system includes a computing platform having a hardware processor and a system memory storing a software code, a display coupled to the computing platform, and a visual filter and at least partially surrounding the display and having an opaque mode and a transparent mode. The hardware processor executes the software code to set the visual filter to the opaque mode to obscure the display. The hardware processor also executes the software code to generate a visual image using the display, to obtain an operating parameter of the image display system corresponding to a status of the display, and to detect that the operating parameter meets a predetermined criterion. In response to detecting that the operating parameter meets the predetermined criterion, the hardware processor further executes the software code to set the visual filter to the transparent mode to make the display visible.

20 Claims, 7 Drawing Sheets

(56) References Cited

U.S. PATENT DOCUMENTS

| | | |
|---|---|---|
| 6,208,318 B1 | 3/2001 | Anderson |
| 6,481,851 B1 | 11/2002 | McNelley |
| 6,801,185 B2 | 10/2004 | Salley |
| 7,002,604 B1 | 2/2006 | Barrus |
| 7,477,252 B2 | 1/2009 | Chun |
| 7,490,941 B2 | 2/2009 | Mintz |
| 7,587,120 B2 | 9/2009 | Koo |
| 7,708,640 B2 | 5/2010 | Burak |
| 8,233,032 B2 | 7/2012 | Yukich |
| 8,698,966 B2 | 4/2014 | Liu |
| 9,053,660 B2 | 6/2015 | Liu |
| 9,186,595 B1 | 11/2015 | Cannon |
| 10,310,284 B1 | 6/2019 | Waldron |
| 2004/0082283 A1 | 4/2004 | Lindell |
| 2005/0035962 A1 | 2/2005 | Ishibashi |
| 2005/0083570 A1 | 4/2005 | Ueda |
| 2007/0293299 A1 | 12/2007 | Aida |
| 2009/0312979 A1 | 12/2009 | Pan |
| 2011/0199373 A1 | 8/2011 | Liu |
| 2012/0194419 A1* | 8/2012 | Osterhout .......... G02B 27/0093 345/156 |
| 2012/0293941 A1 | 11/2012 | Myerchin |
| 2013/0050198 A1 | 2/2013 | Song |
| 2013/0092805 A1 | 4/2013 | Funk |
| 2013/0100126 A1 | 4/2013 | Kim |
| 2013/0100358 A1 | 4/2013 | De Collibus |
| 2013/0343743 A1* | 12/2013 | Yen ........................ F16M 11/10 396/428 |
| 2014/0118271 A1 | 5/2014 | Lee |
| 2015/0193084 A1* | 7/2015 | Juni ....................... G03B 21/00 345/175 |
| 2015/0212718 A1 | 7/2015 | Kellhammer |
| 2015/0288857 A1* | 10/2015 | Fay ..................... H04N 5/2251 348/36 |
| 2017/0115488 A1 | 4/2017 | Ambrus |
| 2017/0343804 A1* | 11/2017 | Choi .................. G02B 27/0101 |
| 2018/0024373 A1 | 1/2018 | Joseph |
| 2018/0224678 A1* | 8/2018 | Jung, II .............. G02F 1/13318 |
| 2019/0156710 A1 | 5/2019 | Hanson |

OTHER PUBLICATIONS

File History of Related U.S. Appl. No. 15/888,896, filed Feb. 5, 2018, and titled "Floating Image Display System".
File History of Related U.S. Appl. No. 15/985,477, filed May 21, 2018, and titled "Electrical Charger for a Spinning Device".
File History of Related U.S. Appl. No. 15/985,502, filed May 21, 2018, and titled "Display of a Floating Image With Depth Enhancement".
File History of Related U.S. Appl. No. 15/983,006, filed May 17, 2018, and titled "Multi-Perspective Display of an Image".
File History of Related U.S. Appl. No. 16/002,947, filed Jun. 7, 2018, and titled "Image Generation System Including a Spinning Display".

* cited by examiner

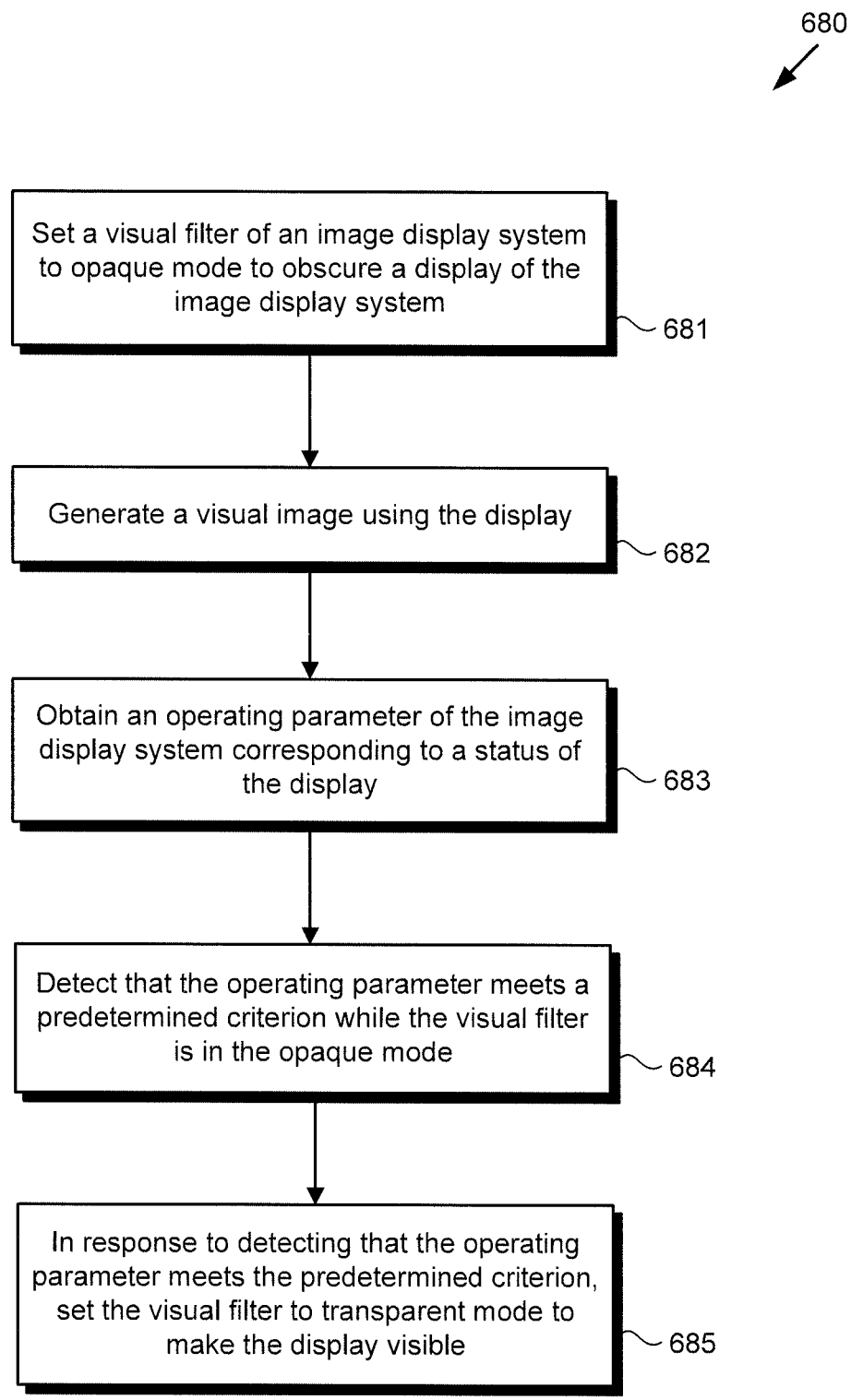

IMAGE DISPLAY SYSTEM WITH VISUAL FILTER

BACKGROUND

Advances in computer technology and software have made possible the creation of richly featured virtual characters capable of simulating interactivity with a human observer of the virtual character. The illusion of interactivity may be even greater when the virtual character appears to be independent of the display system generating it. For example, the virtual character may be shown as an image that appears to float in space. Moreover, the immersiveness of the experience for the observer may be further enhanced if the process of generating the virtual image is imperceptible.

SUMMARY

There are provided systems and methods for displaying an image using a visual filter, substantially as shown in and/or described in connection with at least one of the figures, and as set forth more completely in the claims.

BRIEF DESCRIPTION OF THE DRAWINGS

FIG. 6 shows a flowchart outlining an exemplary method for displaying an image using a visual filter, according to one implementation.

DETAILED DESCRIPTION

Figure 1:
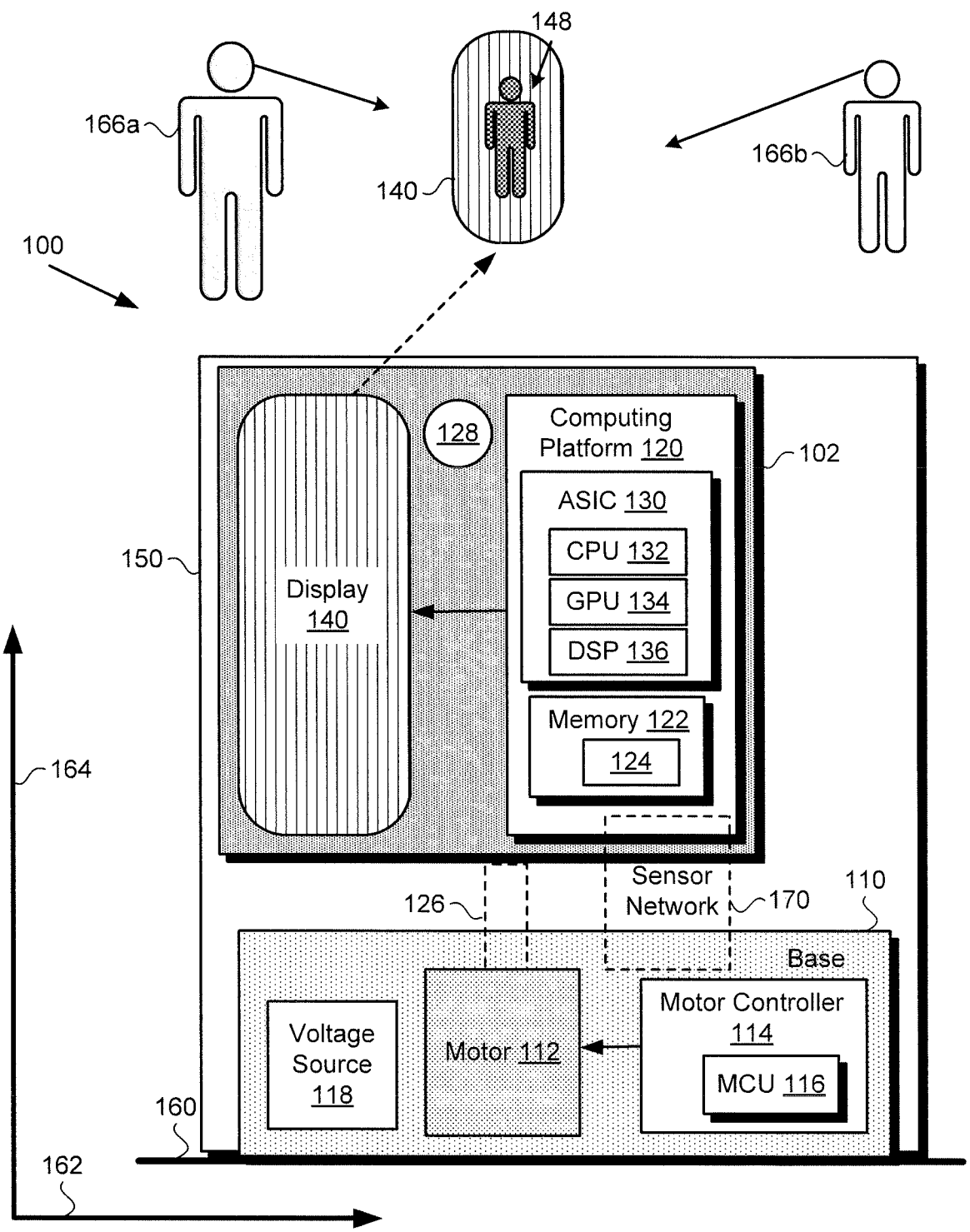
FIG. 1A shows a diagram of an exemplary image display system including a visual filter, according to one implementation.
FIG. 1B shows a diagram of an exemplary sensor network suitable for use as part of an image display system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for displaying an image using a visual filter. FIG. 1A shows a diagram of exemplary image display system 100, according to one implementation. As shown in FIG. 1A, image display system 100 includes image generator 102 configured to rotate, stationary base 110 coupled to image generator 102 by rotor 126, and visual filter 150 surrounding at least image generator 102.

As further shown in FIG. 1A, image generator 102 includes display 140, computing platform 120 communicatively coupled to display 140 so as to control display 140, and may include light source 128 also controlled by computing platform 120. Computing platform 120 includes application specific integrated circuit (ASIC) 130 including central processing unit (CPU) 132 implemented as a hardware processor, graphics processing unit (GPU) 134 also implemented as a hardware processor, and may further include digital signal processor (DSP) 136. Computing platform 120 also includes system memory 122 implemented as a non-transitory storage device storing software code 124.

Base 110 includes motor 112 for rotating rotor 126 and image generator 102, motor controller circuit 114 including motor control unit (MCU) 116, and may include voltage source 118. Base 110 is situated on surface 160, which may be a floor or any other substantially horizontal surface. In addition, FIG. 1A shows horizontal axis 162 substantially parallel to surface 160, and vertical axis 164 substantially perpendicular to surface 160. Also shown in FIG. 1A are sensor network 170 bridging base 110 and image generator 102, and visual image 148 displayed by image generator 102, as well as observers 166a and 166b viewing visual image 148 from different perspectives. It is noted that the combination of computing platform 120 of image generator 102, sensor network 170, and motor controller circuit 114 of base 110 enable the necessary time synchronization between the revolutions per second (rps) of motor 112 and rotor 126, and the frame rate in frames per second (fps) at which display 140 renders images.

By way of definition, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 120, as well as a Control Unit (CU) for retrieving programs, such as software code 124, from system memory 122. A GPU is configured to reduce the processing overhead of the CPU by performing computationally intensive graphics processing tasks.

In addition, for the purposes of the present application, the term "perspective" refers to the particular viewing angle from which an object, virtual object, or image is viewed by an observer. Referring to FIG. 1A, for example, a perspective of visual image 148 refers to the viewing angle of an observer of visual image 148 with respect to a circle substantially concentric with rotor 126 of image display system 100, in a plane substantially perpendicular to vertical axis 164.

Furthermore, the terms "render" and "rendering" are defined to mean causing one or more images to appear on a display screen, such as display 140. Thus, rendering an image may mean causing an entirely new image to appear on the display, or refreshing an image previously appearing on the display. It is noted that although FIG. 1A shows two observers 166a and 166b, that representation is provided merely for conceptual clarity. More generally, observers 166a and 166b may correspond to a single observer, or to more or many more than two observers who may be positioned so as to view visual image 148 from a variety of perspectives.

Figure 1B:
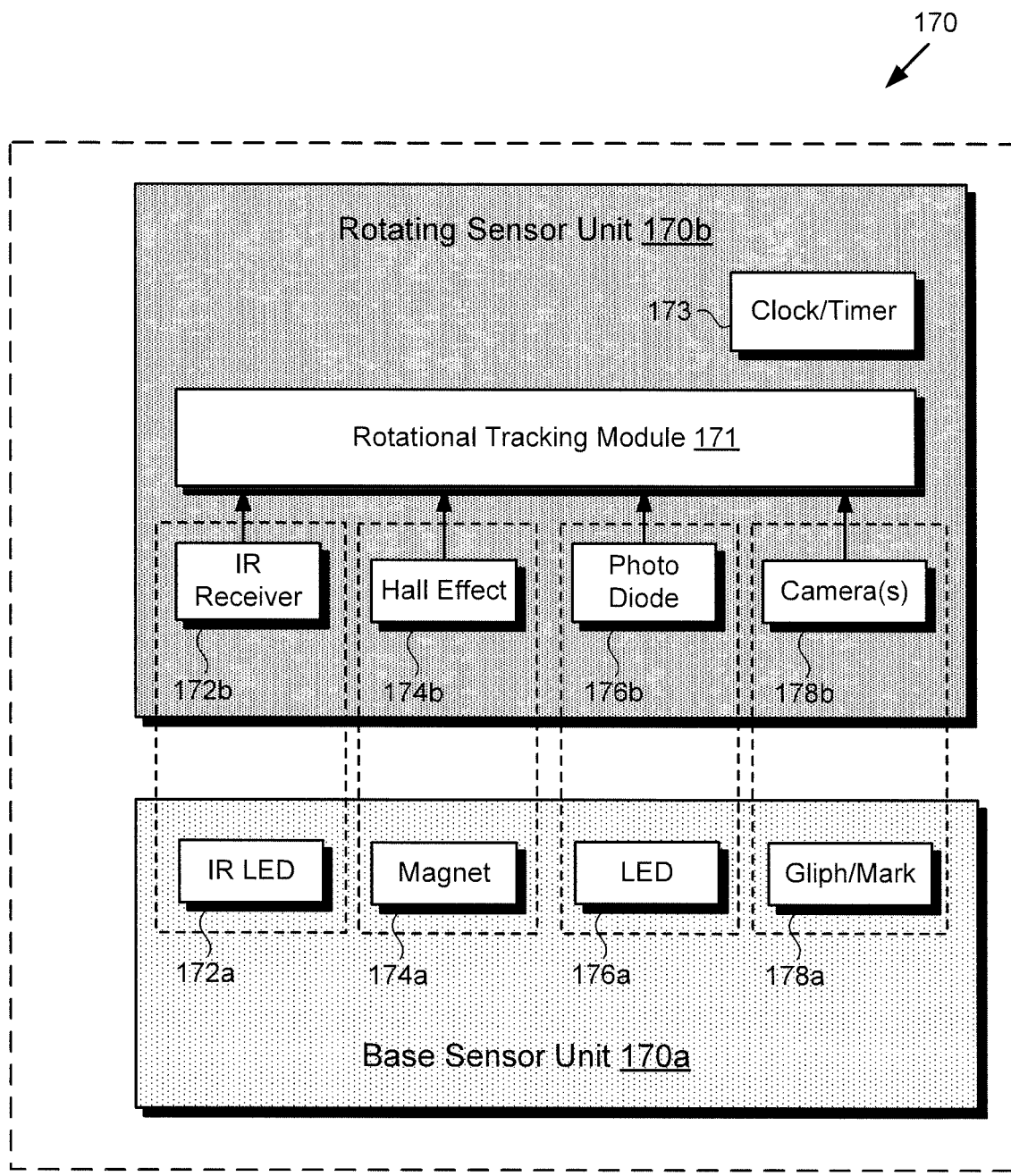

FIG. 1B shows a more detailed exemplary implementation of sensor network 170, in FIG. 1A. As shown in FIG. 1B, sensor network 170 can include base sensor unit 170a integrated with base 110, and rotating sensor unit 170b integrated with image generator 102 and configured to rotate with display 140.

According to the exemplary implementation shown in FIG. 1B, base sensor unit 170a may include one or more of infrared (IR) light-emitting diode (LED) 172a, magnet 174a, visible light LED 176a, and glyph or other visible marker 178a, to name a few examples. As further shown in FIG. 1B, rotating sensor unit 170b may include one or more of IR receiver 172b for sensing IR LED 172a, Hall effect sensor 174b for sensing magnet 174a, photo diode 176b for sensing visible light LED 176a, and one or more camera(s) 178b for sensing glyph or visible marker 178a. In addition, rotating sensor unit 170b is shown to include rotational tracking module 171 and clock or timer 173.

It is noted that the distribution of features identified by reference numbers 172a, 174a, 176a, 178a, 172b, 174b, 176b, and 178b between base sensor unit 170a and rotating sensor unit 170b is merely exemplary. In another implementation, for example, the positions of features 172a, 174a, 176a, 178a, 172b, 174b, 176b, and 178b may be reversed. That is to say, one or more of IR LED 172a, magnet 174a, visible light LED 176a, and glyph or visible marker 178a may be included in rotating sensor unit 170b, while one or more of IR receiver 172b, Hall effect sensor 174b, photo diode 176b, and camera(s) 178b may be included in base sensor unit 170a.

Moreover, in some implementations, clock or timer 173 may be included in base sensor unit 170a rather than in rotating sensor unit 170b. It is further noted that camera(s) 178b may include one or more still camera(s) and/or one or more video camera(s), for example.

As indicated in FIG. 1B, in some implementations, data from one or more of IR receiver 172b, Hall effect sensor 174b, photo diode 176b, and camera 178b is processed by rotational tracking module 171 to identify the rotational position and/or spin rate of display 140 being tracked by sensor network 170 at any point in time. In those implementations, the output from rotational tracking module 171 may be obtained by software code 124 to determine an operating parameter of image display system 100 corresponding to a status of display 140.

Figure 2:
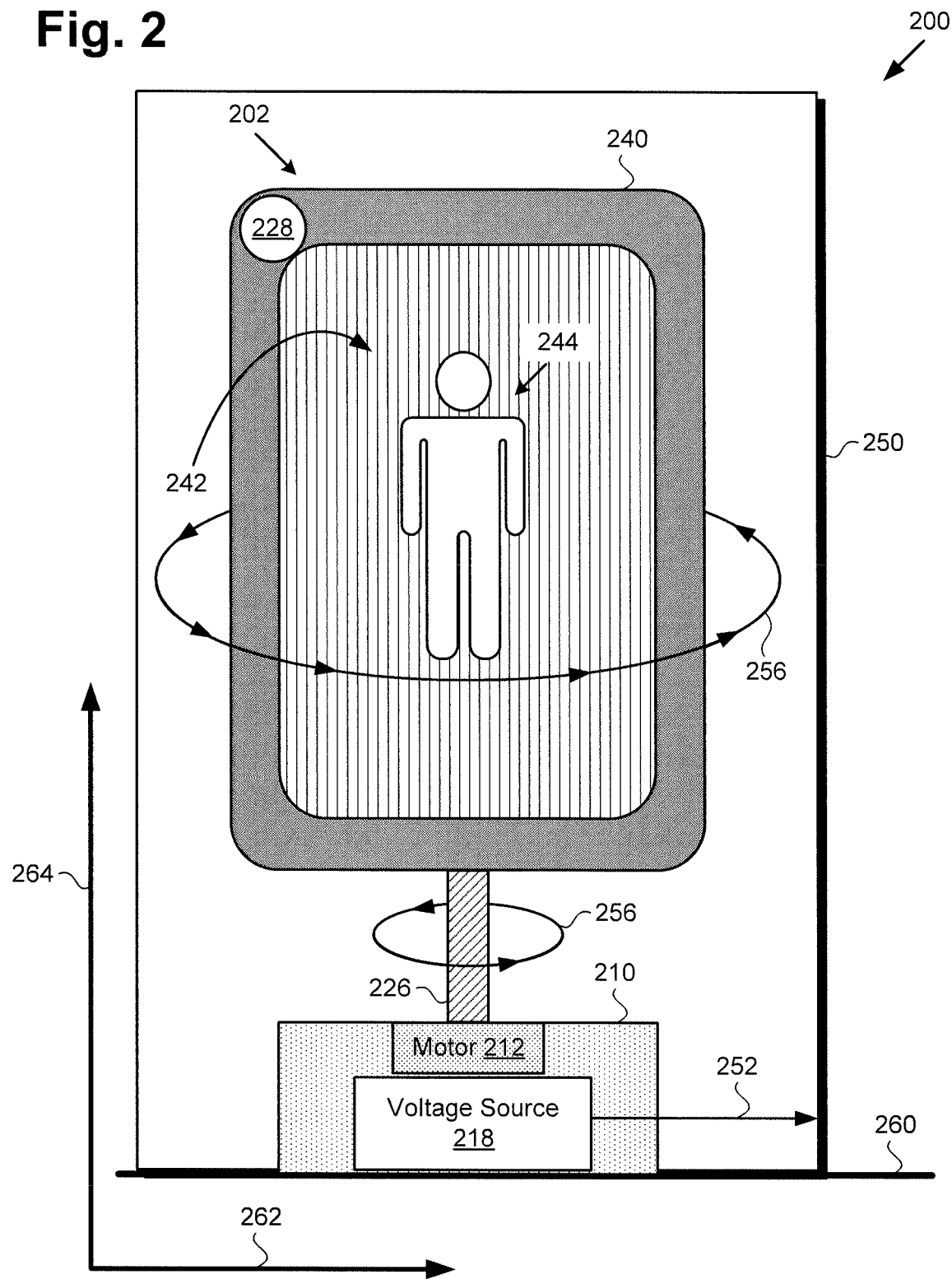
FIG. 2 shows a diagram of an exemplary image display system including a visual filter, according to another implementation.

FIG. 2 shows a diagram of exemplary display system 200, according to another implementation. As shown in FIG. 2, display system 200 includes base 210 and image generator 202. Base 210 is shown to include motor 212, may further include voltage source 218, and is situated on surface 260, which may be a floor or any other substantially horizontal surface. In addition, according to the exemplary implementation shown in FIG. 2, image display system 200 includes rotor 226 coupling base 210 to image generator 202.

Image generator 202 includes display 240 having display surface 242, and may include light source 228. Also shown in FIG. 2 are horizontal axis 262 substantially parallel to surface 260, vertical axis 264 substantially perpendicular to surface 260, spin direction 256 of rotor 226 and display 240, two-dimensional (2D) graphic 244 rendered on display 240, visual filter 250 at least partially surrounding display 240, and control voltage 252 supplied by voltage source 218.

Image display system 200 including visual filter 250 corresponds in general to image display system 100 including visual filter 150, in FIG. 1A. As a result, image display system 200 and visual filter 250 may share any of the features or functionality attributed to image display system 100 and visual filter 150 by the present disclosure, and vice versa. In addition, rotor 226, and base 210 including motor 212 and voltage source 218, correspond respectively in general to rotor 126, and base 110 including motor 112 and voltage source 118, in FIG. 1A. Thus, rotor 226, base 210, motor 212, and voltage source 218 may share any of the features or functionality attributed to rotor 126, base 210, motor 112, and voltage source 118 by the present disclosure, and vice versa. That is to say, although not explicitly shown in FIG. 2, base 210 includes features corresponding respectively to motor controller circuit 114 and MCU 116.

Moreover, image generator 202 including display 240 and light source 228 corresponds in general to image generator 102 including display 140 and light source 128, in FIG. 1A. Thus, image generator 202, display 240, and light source 228 may share any of the features or functionality attributed to image generator 102, display 140, and light source 128 by the present disclosure, and vice versa. In other words, although not explicitly shown in FIG. 2, image generator 202 includes features corresponding respectively to ASIC 130 having CPU 132, GPU 134, and DSP 136, and system memory 122 storing software code 124. Furthermore, like image display system 100, image display system 200 includes sensor network 170 bridging base 210 and image generator 202.

Referring to FIGS. 1A and 2 in combination, according to the exemplary implementation shown in FIG. 2, display 140/240 may be controlled by CPU 132 and/or GPU 134 of ASIC 130, while rotor 126/226 coupled to display 140/240 of image generator 102/202 is controlled by CPU 132 of ASIC 130. CPU 132 of ASIC 130 is configured to execute software code 124 to render 2D graphic 244 on display 140/240 using CPU 132 and/or GPU 134.

CPU 132 is further configured to execute software code 124 to utilize motor 112/212 to spin rotor 126/226 and display 140/240 about vertical axis 164/264 parallel to display surface 242 of display 140/240 at a predetermined spin rate to generate visual image 148 corresponding to 2D graphic 244. As a result of the image generation performed by image generator 102/202, visual image 148 may appear to be floating in space, and/or may appear to be a three-dimensional (3D) image corresponding to 2D graphic 244.

In some implementations, display 140/240 may be a liquid-crystal display (LCD), for example. Moreover, in some implementations, display 140/240 may be provided by a mobile communication device serving as image generator 102/202, the mobile communication device being coupled to rotor 126/226, and being configured to spin with rotor 126/226 and display 140/240 at the predetermined spin rate. For example, display 140/240 may be part of a smartphone or a tablet computer including computing platform 120.

It is noted that CPU 132 may execute software code 124 to control motor 112/212 in order to spin rotor 126/226 and display 140/240 about vertical axis 164/264 at a varying spin rate, or at a substantially constant predetermined spin rate. It is also noted that spin direction 256 may be in either a counter clockwise direction with respect to the plane of horizontal axis 162/262, as shown in FIG. 2, or in a clockwise direction with respect to that plane.

In some implementations, CPU 132 may execute software code 124 to use GPU 134 to change 2D graphic 244 as rotor 126/226 and display 140/240 rotate, so as to generate multiple perspectives of visual image 148 that are appropriate respectively to the locations of each of observers 166a and 166b. For example, observer 166a located so as to face a front side of visual image 148 and stationary at that location might consistently view visual image 148 from a frontal perspective. By contrast, observer 166b located so as to face a backside of visual image 148, i.e., 180° apart from the perspective of observer 166a, and stationary at that location might consistently view visual image 148 as if from the rear.

In some use cases, it may be advantageous or desirable to enhance the illusion that visual image 148 is floating in space independently of image generator 102/202. When implemented for those use cases, image generator 102/202 may further include visual filter 150/250. Visual filter 150/250 may be implemented as a liquid-crystal shutter, such as a polymer-dispersed liquid-crystal (PDLC), or "smart glass" shutter, for example, having an opaque mode and a transparent mode, and at least partially surrounding one or more of display 140/240, rotor 126/226, and base 110/210. Alternatively, visual filter 150/250 may be implemented using any suitable electrochromic, photochromic, or thermochromic material. For example, in one implementation, visual filter 150/250 may be implemented as a suspended-particle device (SPD), while in another implementation, visual filter 150/250 may be implemented using a material that changes transparency in response to exposure to ultraviolet (UV) light.

It is noted that, as used in the present application, the term "electrochromic" refers to a material that changes transparency, e.g., transitions from an opaque mode to a transparent mode, in response to the application of a control voltage to the material or to removal of a control voltage applied to the material. By analogy, the term "photochromic" refers to a material that changes transparency in response to exposure to light. By further analogy, the term "thermochromic" refers to a material that changes transparency in response to exposure to heat.

It is further noted that, as used in the present application, the term "suspended-particle device" or "SPD" refers to a visual filter in which particles dispersed in a liquid or on a film have their orientations substantially aligned through application of a control voltage to the SPD, thereby causing the SPD to transition from an opaque mode to a transparent mode. The term "polymer-dispersed liquid-crystal" or "PDLC" refers to a material in which liquid crystals dispersed in a polymer film align in response to an applied control voltage, thereby causing the PDLC material to transition from an opaque mode to a transparent mode.

In some implementations, visual filter 150/250 may be implemented using a material configured to transition from an opaque mode in which visual filter 150/250 has a reflective, mirror-like surface appearance, to a transparent mode revealing display 140/240. For example, a half-silver film may be coated or otherwise deposited onto a transparent surface, such as a glass or plastic surface, for example. In those implementations, the reflective, mirror-like state of visual filter 150/250 obscuring display 140/240 would correspond to its opaque mode, while in its transparent mode, display 140/240 would be visible through visual filter 150/250.

In some other implementations, visual filter 150/250 may include an opaque shield, for example, in the form of a sleeve configured to slide up and down to respectively obscure and reveal display 140/240. The position of the moveable opaque sleeve may be controlled by computing platform 120 in conjunction with an on/off state of floating image generator 102/202. That is to say, when floating image generator 102/202 is off and rotor 126/226 and display 140/240 are at a standstill and would otherwise be visible to observers 166a and 166b, computing platform may control the position of the opaque sleeve to obscure those elements. In those implementations, sliding the opaque shield up to obscure display 140/240 would correspond to an opaque mode for visual filter 150/250, while sliding the opaque shield down to reveal display 140/240 would correspond to a transparent mode of visual filter 150/250.

Regardless of the specific material or materials used to implement visual filter 150/250, visual filter 150/250 may be controlled by computing platform 120 to remain in an opaque mode so as to obscure base 110/210, and/or rotor 126/226, and/or display 140/240 while rotor 126/226 and display 140/240 are spun up to generate visual image 148. Visual filter 150/250 may then be controlled by computing platform 120 to transition from the opaque mode to a transparent mode to make display 140/240 and/or visual image 148 visible.

However, in yet other implementations, one of observers 166a or 166b could turn on floating image generator 102/202 by pulling the opaque sleeve down, thereby activating a switch that begins rotation of rotor 126/226 and display 140/240. The opaque sleeve may be retarded in being pulled down by a spring underlying the opaque sleeve, resulting in a slight mechanical delay that allows rotor 126/226 and display 140/240 to spin up without observers 166a and 166b being able to see 2D graphic 244 as a stationary image while visual image 148 is being generated.

Figure 3A:
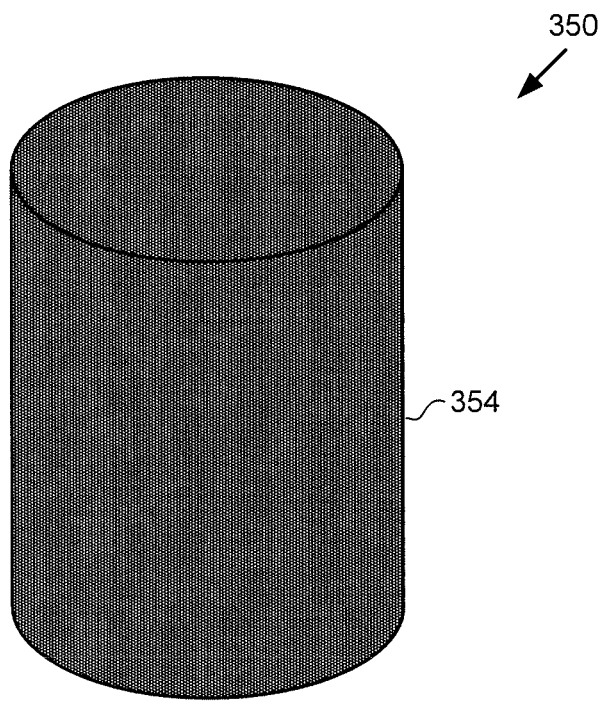
FIG. 3A shows a perspective view of an exemplary visual filter suitable for use in the image display systems of FIGS. 1A and 2 set to an opaque mode, according to one implementation.
Figure 3B:
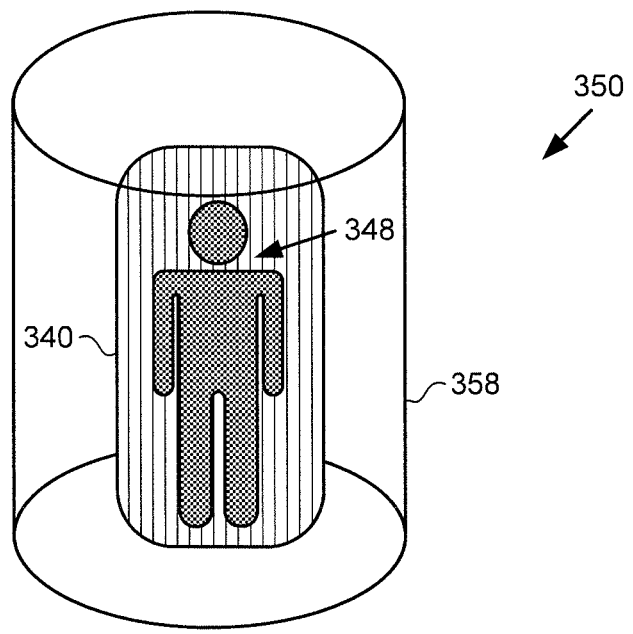
FIG. 3B shows a perspective view of the exemplary visual filter of FIG. 3A set to a transparent mode.

FIG. 3A shows a perspective view of exemplary visual filter 350 suitable for use in image display system 100/200 while visual filter 350 is set to opaque mode 354, according to one implementation. FIG. 3B shows a perspective view of visual filter 350 while visual filter 350 is set to transparent mode 358. Also shown in FIG. 3B is display 340 providing visual image 348.

Visual filter 350, display 340, and visual image 348 correspond respectively to visual filter 150/250, display 140/240, and visual image 148 in FIGS. 1A and 2. As a result, visual filter 350, display 340, and visual image 348 may share any of the characteristics attributed to respective visual filter 150/250, display 140/240, and visual image 148 by the present disclosure, and vice versa.

As shown by FIGS. 3A and 3B, according to the present exemplary implementation, visual filter 150/250/350 may take the form of a cylinder surrounding display 140/240/340. As further shown by FIG. 3A, visual filter 150/250/350 obscures display 140/240/340 when visual filter 150/250/350 is set to opaque mode 354. However, and as shown by FIG. 3B, setting visual filter 150/250/350 to transparent mode 358 makes display 140/240/340 and/or visual image 148/348 visible.

Figure 4A:
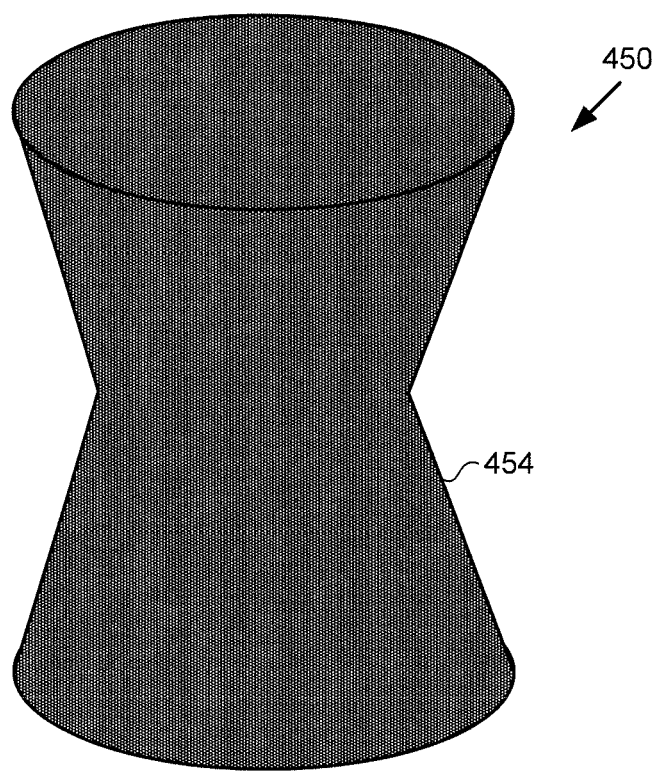
FIG. 4A shows a perspective view of an exemplary visual filter suitable for use in the image display systems of FIGS. 1A and 2 set to an opaque mode, according to another implementation.
Figure 4B:
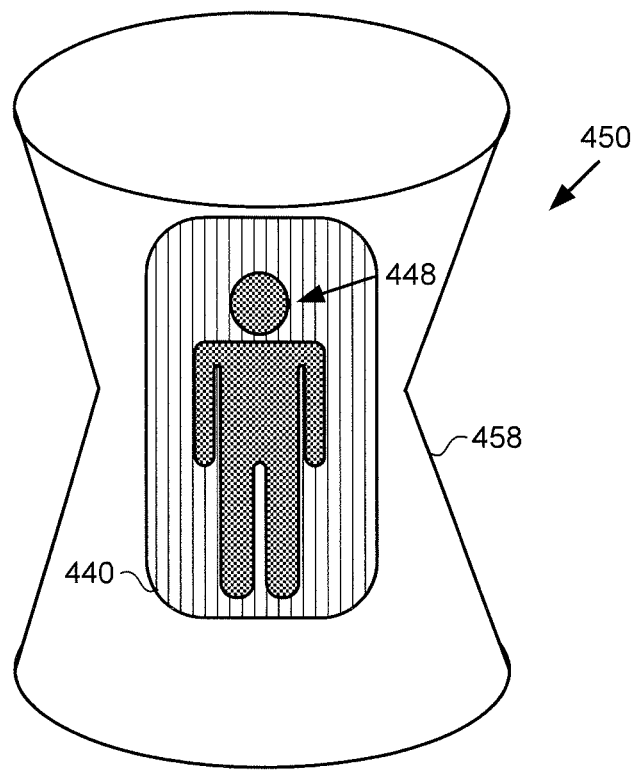
FIG. 4B shows a perspective view of the exemplary visual filter of FIG. 4A set to a transparent mode.

Referring to FIG. 4A, FIG. 4A shows a perspective view of exemplary visual filter 450 suitable for use in image display system 100/200 while visual filter 450 is set to opaque mode 454, according to one implementation. FIG. 4B shows a perspective view of visual filter 450 while visual filter 450 is set to transparent mode 458. Also shown in FIG. 4B is display 440 providing visual image 448.

Visual filter 450, display 440, and visual image 448 correspond respectively to visual filter 150/250/350, display 140/240/340, and visual image 148/348 in FIGS. 1A, 2, 3A, and 3B. As a result, visual filter 450, display 440, and visual image 448 may share any of the characteristics attributed to respective visual filter 150/250/350, display 140/240/340, and visual image 148/348 by the present disclosure, and vice versa.

As shown by FIGS. 4A and 4B, according to the present exemplary implementation, visual filter 150/250/350/450 may take the form of a cylinder having a tapered center or "waist," such as an hourglass shape, for example, surrounding display 140/240/340/440. As further shown by FIG. 4A, visual filter 150/250/350/450 obscures display 140/240/340/440 when visual filter 150/250/350/450 is set to opaque mode 354/454/554. However, and as shown by FIG. 4B, setting visual filter 150/250/350/450 to transparent mode 358/458 makes display 140/240/340/440 and/or visual image 148/348/448 visible.

Figure 5A:
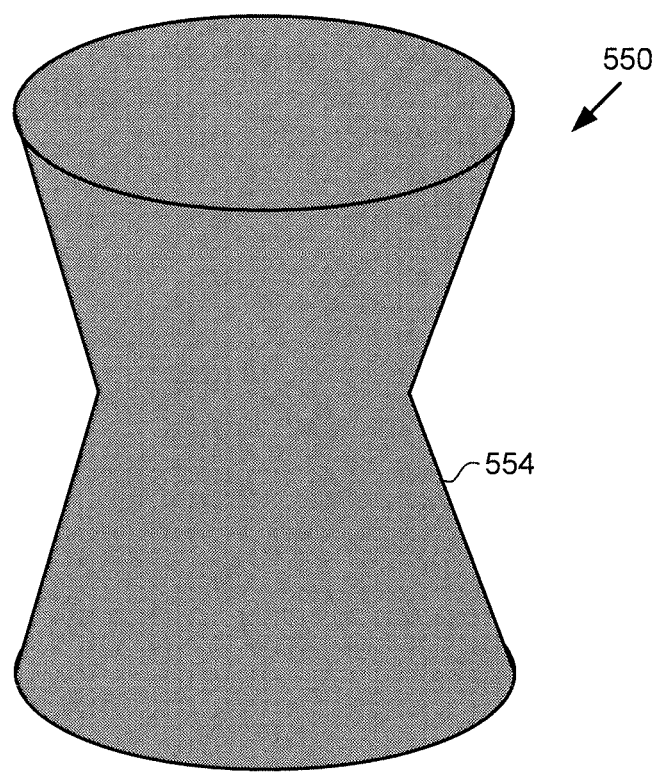
FIG. 5A shows a perspective view of an exemplary visual filter suitable for use in the image display systems of FIGS. 1A and 2 set to an opaque mode, according to yet another implementation.
Figure 5B:
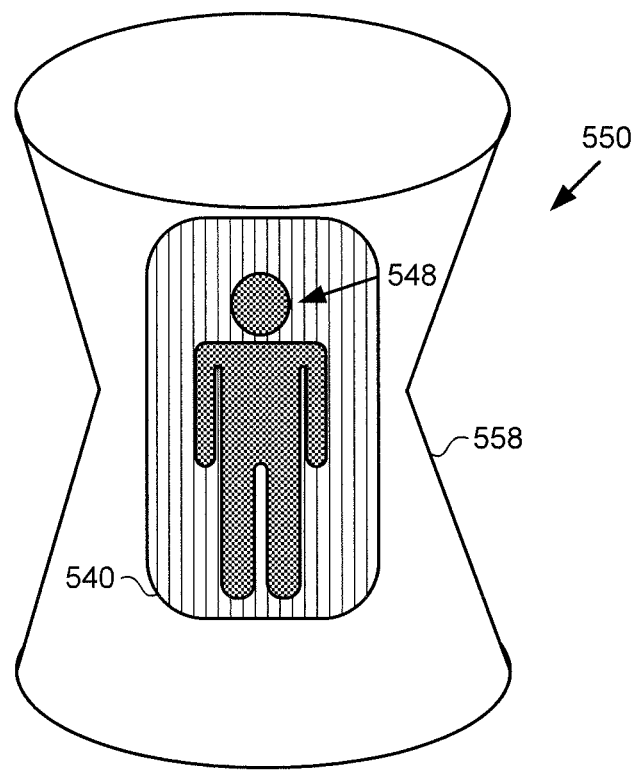
FIG. 5B shows a perspective view of the exemplary visual filter of FIG. 5A set to a transparent mode.

Continuing to FIG. 5A, FIG. 5A shows a perspective view of exemplary visual filter 550 suitable for use in image display system 100/200 while visual filter 550 is set to opaque mode 554 in which visual filter 550 has a reflective, mirror-like surface appearance, according to one implementation. FIG. 5B shows a perspective view of visual filter 550 while visual filter 550 is set to transparent mode 558. Also shown in FIG. 5B is display 540 providing visual image 548.

Visual filter 550, display 540, and visual image 548 correspond respectively to visual filter 150/250/350/450, display 140/240/340/440, and visual image 148/348/448 in FIGS. 1A, 2, 3A, 3B, 4A, and 4B. As a result, visual filter 550, display 540, and visual image 548 may share any of the characteristics attributed to respective visual filter 150/250/350/450, display 140/240/340/440, and visual image 148/348/448 by the present disclosure, and vice versa.

As shown by FIGS. 5A and 5B, according to the present exemplary implementation, like visual filter 450, visual filter 550 may take the form of a cylinder having a tapered center or "waist," such as an hourglass shape, for example, surrounding display 140/240/340/440/550. However, it is noted that in another implementation, visual filter 550 may take the substantially cylindrical shape of visual filter 350, or any other suitable shape. As further shown by FIG. 5A, visual filter 150/250/350/450/550 obscures display 140/240/340/440/540 when visual filter 150/250/350/450 is reflective and mirror-like, i.e., is set to opaque mode 354/454/554. Moreover, and as shown by FIG. 5B, setting visual filter 150/250/350/450/550 to transparent mode 358/458/558 makes display 140/240/340/440/540 and/or visual image 148/348/448/548 visible.

The functionality of image display system 100/200 including visual filter 150/250/350/450/550 will be further described by reference to FIG. 6. FIG. 6 shows flowchart 680 of an exemplary method for displaying an image using a visual filter, according to one implementation. With respect to the method outlined in FIG. 6, it is noted that certain details and features have been left out of flowchart 680 in order not to obscure the discussion of the inventive features in the present application.

Referring to FIG. 6 in combination with FIGS. 1A, 2, 3A, 3B, 4A, 4B, 5A, and 5B, flowchart 680 begins with setting visual filter 150/250/350/450/550 of image display system 100/200 to opaque mode 354/454/554 to obscure display 140/240/340/440/540 of image display system 100/200 (action 681). Visual filter 150/250/350/450/550 may be set to opaque mode 354/454/554 by software code 124, executed by CPU 132 of ASIC 130.

As noted above, in some implementations, visual filter 150/250/350/450/550 may be implemented using an electrochromic material, such as a PDLC, or as an SPD, for example. In those implementations, setting visual filter 150/250/350/450/550 of image display system 100/200 to opaque mode 354/454/554 may include appropriately controlling the voltage of the electrochromic material. As a specific example, in some implementations, setting visual filter 150/250/350/450/550 to opaque mode 354/454/554 may be performed by coupling visual filter 150/250/350/450/550 to a ground voltage of voltage source 118/218.

Alternatively and as also noted above, in some implementations, visual filter 150/250/350/450/550 may be implemented using a photochromic material, such as a UV sensitive material, for example. In those implementations, setting visual filter 150/250/350/450/550 of image display system 100/200 to opaque mode 354/454/554 may include exposing visual filter 150/250/350/450/550 to light emitted by light source 128/228, which may be a UV emission source, for example, to cause the UV sensitive photochromic material to darken.

In yet other implementations, visual filter 150/250/350/450/550 may be implemented as an opaque shield in the form of a sleeve configured to slide up and down to respectively obscure and reveal display 140/240. In those implementations, setting visual filter 150/250/350/450/550 of image display system 100/200 to opaque mode 354/454/554 may include sliding the opaque shield up to obscure display 140/240/340/440/540.

Flowchart 680 may continue with generating visual image 148/348/448/548 using display 140/240/340/440/540 (action 682). Referring to the exemplary implementations of image display system shown by FIGS. 1A and 2, display 140/240/340/440/540 may be controlled by CPU 132 and/or GPU 134 of ASIC 130, while rotor 126/226 coupled to display 140/240/340/440/540 is controlled by CPU 132 and motor controller circuit 114.

CPU 132 of ASIC 130 is configured to execute software code 124 to render 2D graphic 244 on display 140/240/340/440/540. CPU 132 is further configured to execute software code 124 to spin rotor 126/226 and display screen 140/240/340/440/540 about vertical axis 164/264 parallel to display surface 242 of display 140/240/340/440/540 at a predetermined spin rate, which may be on the order of tens of revolutions per second (rps), such as approximately forty rps (40 rps), 60 rps, or more, for example, to generate visual image 148/348/448/548 of 2D graphic 244. As a result of the image generation performed by floating image generator 102/202 using display 140/240/340/440/540, visual image 148/348/448/548 may appear to be a 3D image of 2D graphic 244. Furthermore, visual image 148/348/448/548 may appear to float in space.

It is noted, however, that the image generation performed in action 682 occurs while visual filter 150/250/350/450/550 is in opaque mode 354/454/554. Consequently, display 140/240/340/440/540 and visual image 148/348/448/548 are obscured and substantially imperceptible to observers 166a and 166b during the image generation performed in action 682.

Flowchart 680 may continue with obtaining an operating parameter of image display system 100/200 corresponding to a status of display 140/240/340/440/540 (action 683). Such an operating parameter may be a spin rate of rotor 126/226 and display 140/240/340/440/540 and/or an elapsed time since beginning to generate visual image 148/348/448/548 in action 682.

Referring to FIG. 1B, a spin rate of rotor 126/226 and display 140/240/340/440/540 may be obtained by software code 124, executed by CPU 132 of ASIC 130, and using one or more of IR LED 172a, magnet 174a, visible light LED 176a, and glyph or visible marker 178a in combination with a respective one or more of IR receiver 172b, Hall effect sensor 174b, photo diode 176b, and camera(s) 178b. Alternatively, or in addition, an elapsed time since beginning to generate visual image 148/348/448/548 in action 682 may be obtained by software code 124, executed by CPU 132 of ASIC 130, and using clock or timer 173.

Flowchart 680 may continue with detecting that the operating parameter obtained in action 683 meets a predetermined criterion while visual filter 150/250/350/450/550 is in opaque mode 354/454/554 (action 684). Detecting that the operating parameter obtained in action 683 meets the predetermined criterion may be performed by software code 124, executed by CPU 132 of ASIC 130, and using one or both of rotational tracking module 171 and clock or timer 173 of sensor network 170.

For example, it may be advantageous or desirable to maintain visual filter 150/250/350/450/550 in opaque mode 354/454/554 until the spin rate of rotor 126/226 and display 140/240/340/440/540 reach a predetermined value, in rps for example, as detected using rotational tracking module 171. Alternatively, or in addition, it may be advantageous or desirable to maintain visual filter 150/250/350/450/550 in opaque mode 354/454/554 until a predetermined time interval has elapsed since beginning to generate visual image 148/348/448/548 in action 682, as detected using clock or timer 173.

Flowchart 680 can conclude with, in response to detecting that the operating parameter meets the predetermined criterion in action 684, setting visual filter 150/250/350/450/550 to transparent mode 358/458/558 to make display 140/240/340/440/540 visible (action 685). Visual filter 150/250/350/450/550 may be set to transparent mode 358/458/558 by software code 124, executed by CPU 130 of ASIC 130.

As noted above, in some implementations, visual filter 150/250/350/450/550 may be implemented using an electrochromic material, such as a PDLC, or as an SPD, for example. In those implementations, setting visual filter 150/250/350/450/550 to transparent mode 358/458/558 may include appropriately controlling the voltage of the electrochromic material. As a specific example, in some implementations, setting visual filter 150/250/350/450/550 to transparent mode 358/458/558 may be performed by coupling visual filter 150/250/350/450/550 to control voltage 252 supplied by voltage source 118/218.

Alternatively and as also noted above, in some implementations, visual filter 150/250/350/450/550 may be implemented using a photochromic material, such as a UV sensitive material, for example. In those implementations, setting visual filter 150/250/350/450/550 to transparent mode 358/458/558 may include turning off light source 128/228, which may be a UV emission source, for example.

In yet other implementations, visual filter 150/250/350/450/550 may be implemented as an opaque shield in the form of a sleeve configured to slide up and down to respectively obscure and reveal display 140/240. In those implementations, setting visual filter 150/250/350/450/550 to transparent mode 358/458/558 may include retracting the opaque shield by sliding the opaque shield down to make display 140/240/340/440/540 visible.

Thus, the present application discloses systems and methods for displaying an image using a visual filter. By setting the visual filter to an opaque mode, the present solution obscures a display for presenting the image to viewers while the image is being generated. Moreover, by obtaining an operating parameter of the image display system and detecting that the operating parameter meets a predetermined criterion before setting the visual filter to a transparent mode, the present solution advantageously ensures that the process of generating the visual image remains imperceptible to the viewers.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image display system comprising:
    a computing platform having a hardware processor and a system memory storing a software code;
    a display coupled to the computing platform;
    a base including a motor coupled to a rotor for rotating the display; and
    a visual filter at least partially surrounding the display, the visual filter having an opaque mode and a transparent mode;
    the hardware processor configured to execute the software code to:
       set the visual filter to the opaque mode to obscure the display;
       spin the rotor using the motor to thereby spin the display;
       generate a visual image using the display;
       obtain a spin rate for the rotor while being spun by the motor;
       detect that the spin rate of the rotor meets a predetermined spin rate while the visual filter is in the opaque mode; and
       in response to detecting that the spin rate of the rotor meets the predetermined spin rate, set the visual filter to the transparent mode to make the display and thereby the visual image on the display visible.

2. The image display system of claim 1 further comprising a voltage source, wherein to set the visual filter to the transparent mode, the hardware processor is further configured to execute the software code to apply a voltage to the visual filter using the voltage source.

3. The image display system of claim 1, wherein the visual filter comprises an electrochromic material.

4. The image display system of claim 1, wherein the visual filter comprises one of a polymer-dispersed liquid-crystal (PDLC) and a suspended-particle device (SPD).

5. The image display system of claim 1, wherein the visual filter comprises a photochromic material.

6. The image display system of claim 1, wherein the visual filter, when set to the opaque mode, has a reflective, mirror-like, surface appearance.

7. The image display system of claim 1, wherein to generate the visual image, the hardware processor is further configured to execute the software code to:
    render the visual image as a two-dimensional (2D) graphic on the display; and
    wherein spinning the rotor and the display makes the 2D graphic appear as a three-dimensional (3D) floating image.

8. The image display system of claim 1, wherein the display is part of a mobile communication device configured to spin with the display.

9. The image display system of claim 8, wherein the mobile communication device comprises the computing platform.

10. The image display system of claim 1, wherein the hardware processor is configured to execute the software code to start spinning the rotor after generating the visual image using the display.

11. A method for use by an image display system including a computing platform having a hardware processor and a system memory storing a software code, a display coupled to the computing platform, a base including a motor coupled to a rotor for rotating the display, and a visual filter at least partially surrounding the display, the visual filter having an opaque mode and a transparent mode, the method comprising:

setting, using the hardware processor, the visual filter to the opaque mode to obscure the display;
spinning the rotor using the motor to thereby spin the display;
generating, using the hardware processor and the display, a visual image;
obtaining, using the hardware processor, a spin rate for the rotor while being spun by the motor;
detecting that the spin rate of the rotor meets a predetermined spin rate while the visual filter is in the opaque mode; and
in response to detecting that the spin rate of the rotor meets the predetermined spin rate, setting, using the hardware processor, the visual filter to the transparent mode to make the display and thereby the visual image on the display visible.

12. The method of claim 11, wherein the image display system further comprises a voltage source, and wherein setting the visual filter to the transparent mode comprises applying a voltage to the visual filter using the voltage source.

13. The method of claim 11, wherein the visual filter comprises an electrochromic material.

14. The method of claim 11, wherein the visual filter comprises one of a polymer-dispersed liquid-crystal (PDLC) and a suspended-particle device (SPD).

15. The method of claim 11, wherein the visual filter comprises a photochromic material.

16. The method of claim 11, wherein setting the visual filter in the opaque mode causes the visual filter to have a reflective, mirror-like, surface appearance.

17. The method of claim 11, wherein generating the visual image comprises:

rendering a two-dimensional (2D) graphic on the display; and
wherein spinning the rotor and the display makes the 2D graphic appear as a three-dimensional (3D) floating image.

18. An image display system comprising:

a computing platform having a hardware processor and a system memory storing a software code;
a display coupled to the computing platform;
a base including a motor coupled to a rotor for rotating the display; and
a visual filter at least partially surrounding the display, the visual filter having an opaque mode and a transparent mode;
the hardware processor configured to execute the software code to:
set the visual filter to the opaque mode to obscure the display;
spin the rotor using the motor to thereby spin the display;
generate a visual image using the display;
start a timer for determining an elapsed time;
detect that the elapsed time meets a predetermined time while the visual filter is in the opaque mode; and
in response to detecting that the elapsed time meets a predetermined time, set the visual filter to the transparent mode to make the display and thereby the visual image on the display visible.

19. The image display system of claim 18, wherein the hardware processor is configured to execute the software code to start the timer after generating the visual image using the display.

20. The image display system of claim 18, wherein to generate the visual image, the hardware processor is further configured to execute the software code to:

render the visual image as a two-dimensional (2D) graphic on the display; and
wherein spinning the rotor and the display makes the 2D graphic appear as a three-dimensional (3D) floating image.

* * * * *